US012794008B2

(12) United States Patent
Lu et al.

(10) Patent No.: US 12,794,008 B2
(45) Date of Patent: Nov. 10, 2026

(54) ASSEMBLING METHOD FOR BATTERY PACK, BATTERY PACK AND VEHICLE

(71) Applicant: BYD COMPANY LIMITED, Shenzhen (CN)

(72) Inventors: Peng Lu, Shenzhen (CN); Qingbo Peng, Shenzhen (CN); Zhipei Lu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 548 days.

(21) Appl. No.: 18/475,769

(22) Filed: Sep. 27, 2023

(65) Prior Publication Data

US 2024/0021861 A1 Jan. 18, 2024

Related U.S. Application Data

(63) Continuation of application No. PCT/CN2022/099306, filed on Jun. 17, 2022.

(30) Foreign Application Priority Data

Jun. 28, 2021 (CN) ........................ 202110721306.6

(51) Int. Cl.

| | |
|---|---|
| ***H01M 10/04*** | (2006.01) |
| ***H01M 50/211*** | (2021.01) |
| ***H01M 50/233*** | (2021.01) |

(52) U.S. Cl.

CPC ....... *H01M 10/049* (2013.01); *H01M 50/211* (2021.01); *H01M 50/233* (2021.01); *H01M 2220/20* (2013.01)

(58) Field of Classification Search

CPC ............. H01M 10/049; H01M 50/211; H01M 50/233; H01M 50/258; H01M 2220/20

(Continued)

(56) References Cited

U.S. PATENT DOCUMENTS

2009/0214941 A1* 8/2009 Buck .................. H01M 50/291 429/120
2014/0030574 A1* 1/2014 Lee .................. H01M 10/6555 429/157

(Continued)

FOREIGN PATENT DOCUMENTS

CN 202268394 U 6/2012
CN 103840214 A 6/2014

(Continued)

OTHER PUBLICATIONS

The World Intellectual Property Organization (WIPO) International Search Report for PCT/CN2022/099306 Aug. 26, 2022 5 Pages.

*Primary Examiner* — James M Erwin
(74) *Attorney, Agent, or Firm* — Wenye Tan

(57) ABSTRACT

Provided are a battery pack using a method for assembling a battery pack and a vehicle. The battery pack includes a box and battery modules. The box is provided with cavities inside. The battery module includes foam and multiple cells. The foam is arranged between adjacent cells. The method for assembling a battery pack includes the following steps: the battery module is loaded into an insulating bag; the insulating bag is vacuumized so that the foam is compressed to reduce the volume of the battery module; and after the battery module of the reduced volume is inserted into the cavity, a vacuum state is released and positive and negative electrodes of the battery module are exposed.

12 Claims, 3 Drawing Sheets

(58) Field of Classification Search
USPC .......................................................... 429/163
See application file for complete search history.

(56) References Cited

U.S. PATENT DOCUMENTS

| | | | | |
|---|---|---|---|---|
| 2020/0014004 | A1* | 1/2020 | Bende ................. | H01M 50/296 |
| 2020/0328386 | A1 | 10/2020 | Kellner et al. | |
| 2021/0249731 | A1* | 8/2021 | You .................. | H01M 10/0481 |

FOREIGN PATENT DOCUMENTS

| | | | |
|---|---|---|---|
| CN | 204067518 | U | 12/2014 |
| CN | 103928730 | B | 8/2016 |
| CN | 106410324 | A | 2/2017 |
| CN | 206480683 | U | 9/2017 |
| CN | 206742405 | U | 12/2017 |
| CN | 108305967 | A | 7/2018 |
| CN | 111341954 | A | 6/2020 |
| CN | 211088325 | U | 7/2020 |
| CN | 212783640 | U | 3/2021 |
| CN | 213026293 | U | 4/2021 |
| EP | 3758090 | A1 | 12/2020 |
| JP | 2007239771 | A | 9/2007 |
| JP | 2009277504 | A | 11/2009 |
| JP | 3178852 | U | 10/2012 |

* cited by examiner

ASSEMBLING METHOD FOR BATTERY PACK, BATTERY PACK AND VEHICLE

CROSS-REFERENCE TO RELATED APPLICATIONS

The present application is a continuation application of PCT application No. PCT/CN2022/099306, filed on Jun. 17, 2022, which claims priority to Chinese Patent Application No. 202110721306.6, filed on Jun. 28, 2021 and entitled "METHOD FOR ASSEMBLING BATTERY PACK, BATTERY PACK AND VEHICLE", and the entire content of all of which is incorporated herein by reference.

FIELD

The present disclosure belongs to the technical field of battery pack production, and more specifically, to a method for assembling a battery pack, a battery pack, and a vehicle.

BACKGROUND

In the production process of battery packs, usually, multiple cells are combined to form battery modules, and the battery modules are assembled in a box to form a battery pack. A good box needs to meet both the requirements of easy assembly of the battery module and a good pre-tightening force given to the battery module.

In the related arts, in order to enable the box to continuously apply the pre-tightening force to the battery module, the size of the box is usually designed to be comparable to the size of the battery module, resulting in the case that it is very difficult to assemble the battery pack and it is quite difficult to insert the battery module into the box by the human labor. If a mechanical tool is used for applying a mechanical force, on the one hand, it is easy to cause damage to the box or the battery module; on the other hand, it also increases the difficulty of assembly and disassembly and reduces the efficiency of assembly and disassembly.

In order to solve the above-described problems, the size of the box is set to be much larger than the size of the battery module, so as to facilitate assembling the battery module. However, such a box often cannot give the battery module a good pre-tightening force, and reduces the volume utilization rate of the battery pack, which increases the volume of the battery pack, and results in that the battery pack occupies a larger space at the bottom of a vehicle, lowering the practicality of the battery pack.

SUMMARY

The present disclosure aims to solve at least one of the technical problems in the related art. To this end, the present disclosure proposes a method for assembling a battery pack.

A second objective of the present disclosure is to provide a battery pack.

A third objective of the present disclosure is to provide a vehicle.

According to the method for assembling a battery pack according to another embodiment of the present disclosure, since the foam is arranged between the adjacent cells, the battery module is first loaded into the insulating bag before the battery module is assembled in the cavity; the foam in the battery module is compressed by vacuumizing the insulating bag, thus reducing the volume of the entire battery module, facilitating assembling the battery module into the box, and improving the assembly efficiency; after the battery module is assembled in the cavity, the vacuum state is released, then, the foam can utilize the high resilience thereof to restore an original volume of the battery module; and the battery module is connected to the inside of the box in an abut-against mode to realize zero-clearance assembly, which improves the volume utilization rate of the battery pack, and ensures that the box can continuously apply a pre-tightening force to the battery module. Due to the above-described arrangement, the size of the box can be designed to be comparable to the size of the battery module, reducing the volume of the box, which then reduces the volume of the battery pack, and improves practicality.

A battery pack according to an embodiment of the present disclosure includes a box in which cavities are provided inside; and battery modules. The battery module is arranged in the cavity. The battery module includes foam and multiple cells. The foam is arranged between adjacent cells. The outside of the battery module is sleeved with an insulating bag. Positive and negative electrodes of the battery module extend out of the insulating bag.

A vehicle according to an embodiment of the present disclosure includes the described battery pack.

The additional aspects and advantages of the present disclosure will become apparent from the following description or may be learned from practices of the present disclosure.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are merely intended to explain the present disclosure and cannot be construed as a limitation to the present disclosure.

In the description of the present disclosure, it should be understood that orientation or position relationships indicated by the terms such as "thickness", "upper", "lower", "front", "back", "top", "bottom", "inside", "outside", and "circumferential" are based on orientation or position relationships shown in the accompanying drawings, and are used only for ease and brevity of the description of the present disclosure, rather than indicating or implying that the mentioned apparatus or component needs to have a particular orientation or needs to be constructed and operated in a particular orientation. Therefore, such terms should not be construed as a limitation to the present disclosure.

A method for assembling a battery pack 1000 according to an embodiment of the present disclosure is described below with reference to the accompanying drawings.

Figure 2:
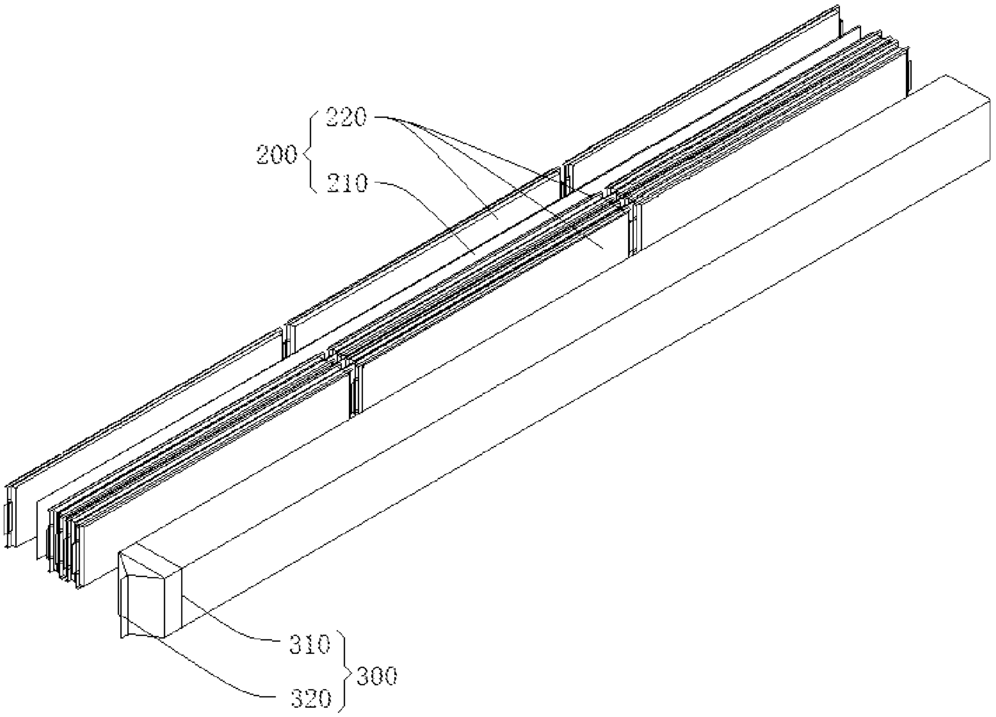
FIG. 2 is an exploded view of a battery module and an insulating bag according to an embodiment of the present disclosure.
Figure 3:
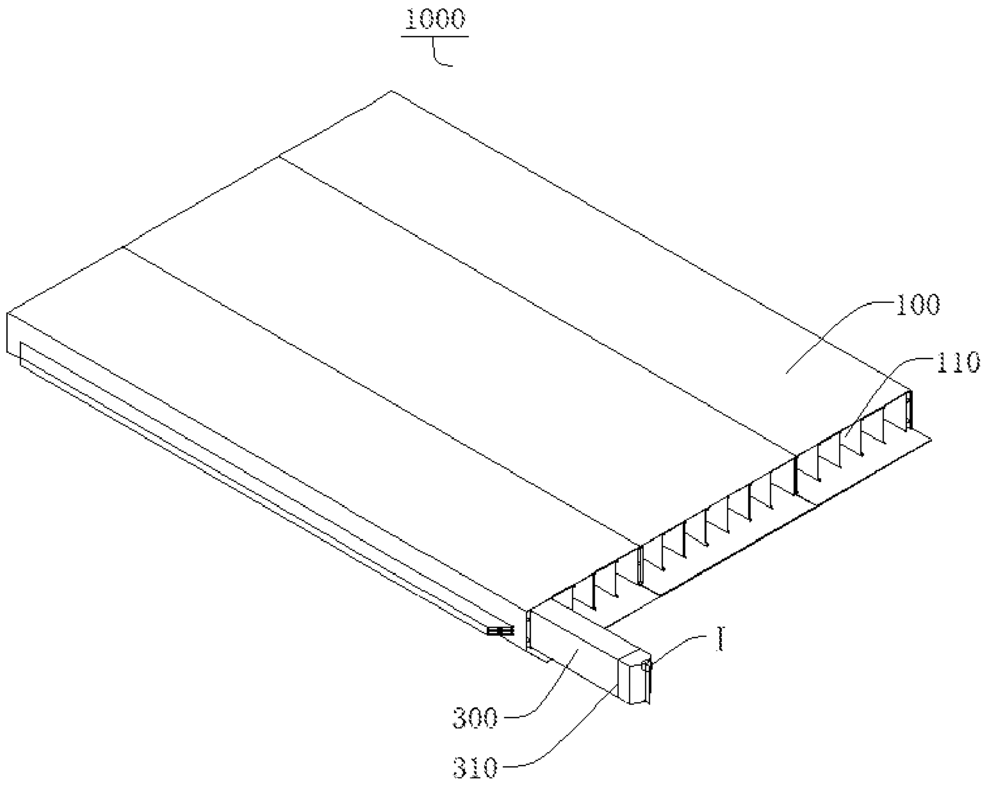
FIG. 3 is a schematic structural diagram of a battery pack according to an embodiment of the present disclosure.

According to a method for assembling a battery pack 1000 according to an embodiment of the present disclosure, in combination with what is shown in FIG. 2 and FIG. 3, the battery pack 1000 includes a box 100 and battery modules 200. The box 100 is provided with cavities 110 inside.

As shown in FIG. 2, the battery module 200 includes foam 210 and multiple cells 220. The foam 210 is arranged between adjacent cells 220.

Figure 1:
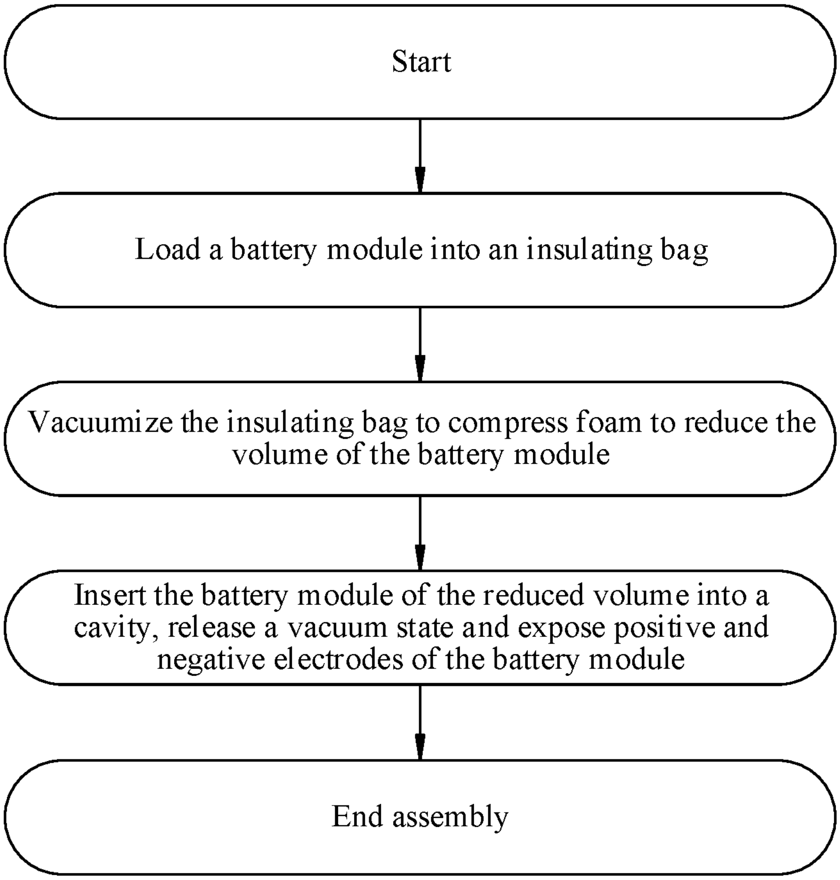
FIG. 1 is a flowchart of a method for assembling a battery pack according to an embodiment of the present disclosure.

As shown in FIG. 1, the method for assembling a battery pack 1000 includes the following steps:

Step S1: The battery module 200 is loaded into an insulating bag 300.

Step S2: The insulating bag 300 is vacuumized so that the foam 210 is compressed to reduce the volume of the battery module 200.

Step S3: After the battery module 200 of the reduced volume is inserted into the cavity 110, a vacuum state is released, and positive and negative electrodes of the battery module 200 are exposed.

According to a method for assembling a battery pack according to an embodiment of the present disclosure, the battery pack includes a box and battery modules. The box is provided with cavities inside. The battery module includes foam and multiple cells. The foam is arranged between adjacent cells. The assembling method includes the following steps: the battery module is loaded into an insulating bag; the insulating bag is vacuumized so that the foam is compressed to reduce the volume of the battery module; and after the battery module of the reduced volume is inserted into the cavity, a vacuum state is released and positive and negative electrodes of the battery module are exposed.

As can be seen from the described method, in the method for assembling a battery pack 1000 according to the embodiment of the present disclosure, since the foam 210 is arranged between the adjacent cells 220, the foam 210 will deform under the action of an external force; after the external force is eliminated, the foam can still restore an original size and shape. Therefore, in the present disclosure, the characteristics of the foam 210 thereof are utilized, and the battery module 200 is first loaded into the insulating bag 300 before the battery module 200 is assembled in the cavity 110; a gap between the foam 210 and the adjacent cells 220 in the battery module 200 is compressed by vacuumizing the insulating bag 300, so as to reduce the volume of the foam 210, thus reducing the distance between the adjacent cells 220, so that the overall size of the battery module 200 is reduced. During the specific assembling process of the battery pack 1000, the battery module 200 smaller in volume can be smoothly assembled into the cavity 110 of the box 100, improving the assembly efficiency and reducing the friction between the battery module 200 and the box 100, reducing abrasion, and prolonging the service life of the battery module 200 and the box 100.

After the battery module 200 is assembled in the cavity 110, the vacuum state of the insulating bag 300 is released, then, the foam 210 can utilize the high resilience thereof to restore the original size and shape, which then increases the distance between the adjacent cells 220, so that the battery module 200 restores to an original volume, and the battery module 200 can be connected to the inside of the box 100 in an abut-against mode, realizing zero-clearance assembly and improving the volume utilization rate of the battery pack 1000.

Because the battery module 200 is connected to the inside of the box 100 in the abut-against mode, sidewalls of the box 100 can give the battery module 200 a good pre-tightening force, so that the position of the battery module 200 is stable.

Finally, it is to be noted that: by assembling the battery pack 1000 with the assembling method described above, during the production of the box 100, the size of the box 100 can be produced to be comparable to the size of the battery module 200, so that the battery module 200 can be quickly and accurately assembled into the box 100 without the need to purposely produce the box 100 with a larger size, and the volume of the box 100 can also be reduced while reducing the assembly difficulty. In the first aspect, materials used for the box 100 are reduced, and the production cost is reduced; in the second aspect, the volume of the battery pack 1000 can be reduced, and the battery pack 1000 is mounted on a vehicle without occupying too much space at the bottom of the vehicle, improving the practicality of the battery pack 1000; in the third aspect, the weight of the battery pack 1000 may also be reduced, and the battery pack 1000 can be light in weight, improving the endurance mileage of the vehicle.

By exposing the positive and negative electrodes of the battery module 200, it is convenient for the battery module 200 to be connected to adjacent battery modules 200 via the positive and negative electrodes to form the battery pack 1000.

It is to be understood that assembling the battery pack 1000 with the method for assembling a battery pack 1000 of the present disclosure cannot give rise to the technical problem that the assembly is difficult or the box 100 cannot give the battery module 200 a good pre-tightening force. The battery pack 1000 assembled with the described assembling method can ensure that the box 100 can give the battery module 200 a good pre-tightening force while the assembly efficiency of the battery pack 1000 is improved, realizing zero-clearance assembly, improving the volume utilization rate of the battery pack 1000, and reducing the volume of the battery pack 1000.

In the description of the present disclosure, unless stated otherwise, the meaning of "multiple" is two or more than two.

According to an embodiment of the present disclosure, the insulating bag 300 is provided with an opening (not shown in the figure) at one end, and the opening is provided with a sealing structure. The sealing structure is used for opening or closing the opening. When the battery module 200 needs to be loaded into the insulating bag 300, the opening is opened through the sealing structure, and the battery module 200 is loaded into the insulating bag 300 through the opening. After the battery module 200 is loaded into the insulating bag 300, the opening is closed through the sealing structure, causing the insulating bag 300 to form a closed structure, which facilitates subsequent vacuumizing of the insulating bag 300.

According to an embodiment of the present disclosure, the insulating bag 300 is provided with an air valve (not shown in the figure), and in the process of vacuumizing the insulating bag 300, a sucking pump can be utilized, the sucking pump is connected to the air valve, and air in the insulating bag 300 can be sucked out under the action of the sucking pump.

The main principle is to suck away the air inside the foam 210, and use the atmospheric pressure to flatten the originally expanded foam 210, thereby making the volume of the foam 210 smaller, which in turn reduces the distance between the adjacent cells 220, so as to reduce the overall size of the battery module 200, ensure that the battery module 200 is inserted into the cavity 110 smoothly, and improve the assembly efficiency of the battery pack 1000.

According to an embodiment of the present disclosure, the air valve is a one-way extracting valve, ensuring that the air within the insulating bag 300 can only be extracted in one direction through the air valve, and preventing gas within the insulating bag 300 from flowing back. It is ensured that the insulating bag 300 is always in a vacuum state when the vacuum state of the insulating bag 300 is not released, facilitating the insertion of the battery module 200 into the cavity 110.

According to an embodiment of the present disclosure, the insulating bag 300 may be made of insulating materials such as polypropylene, polyethylene terephthalate, or polyimide. All of the described materials can ensure that the insulating bag 300 has a good insulating effect, and ensure that when the battery pack 1000 is moved or impacted during movement, the case that the two adjacent battery modules 200 come into contact with each other, causing an internal short circuit is avoided, which prolongs the service life of the battery module 200, and improves the safety of the battery module 200.

In some embodiments of the present disclosure, as shown in FIG. 2 and FIG. 3, the insulating bag 300 is provided with a position to be torn 310, so that the position to be torn 310 can be torn to release the vacuum state. In other words, after the battery module 200 of the reduced volume is inserted into the cavity 110, if the vacuum state of the insulating bag 300 needs to be released, the insulating bag 300 can be released from the vacuum state simply by breaking the position to be torn 310, and the foam 210 utilizes the high resilience thereof to restore the original size and shape, so that the battery module 200 restores to the original volume, realizing zero-clearance assembly of the battery module 200 and the box 100.

Of course, the insulating bag 300 is provided with the opening at one end, and the opening is provided with the sealing structure. Thus, when it is necessary to release the vacuum state of the insulating bag 300, it is also possible to open the opening through the sealing structure, then, external air can enter the inside of the insulating bag 300 through the opening so as to release the vacuum state of the insulating bag 300, and the foam 210 restores the original size and shape, so that the battery module 200 restores to the original volume.

Finally, it is to be noted that: the vacuum state of the insulating bag 300 is released through the position to be torn 310 mainly to remove a portion of the insulating bag 300 to ensure that when the insulating bag 300 is released from the vacuum state, the positive and negative electrodes of the battery module 200 can be exposed to the outside of the insulating bag 300 to facilitate the connection of the adjacent battery modules 200 via the positive and negative electrodes.

According to an embodiment of the present disclosure, the position to be torn 310 is formed in the shape of a ring, and the position to be torn 310 is fractured to remove a portion of the insulating bag 300 to expose the positive and negative electrodes. The shape of a ring herein means that the position to be torn 310 is provided in a circle circumferentially around the insulating bag 300, and when the position to be torn 310 is fractured, the insulating bags 300 located on both sides of the position to be torn 310 are separated, removing the insulating bags 300 close to the positive and negative electrodes of the battery module 200, so as to expose the positive and negative electrodes of the battery module 200.

Finally, it is to be noted that: the described breakage of the position to be torn 310 and fracture of the position to be torn 310 are two different states. The breakage of the position to be torn 310 means that the insulating bag 300 has a hole at the position to be torn 310; when the position to be torn 310 starts to be torn, the vacuum state of the insulating bag 300 is released, but the positive and negative electrodes of the battery module 200 will not be exposed to the outside of the insulating bag 300. The positive and negative electrodes of the battery module 200 are exposed to the outside of the insulating bag 300 only when the position to be torn 310 switches from the breakage to the fracture.

Figure 4:
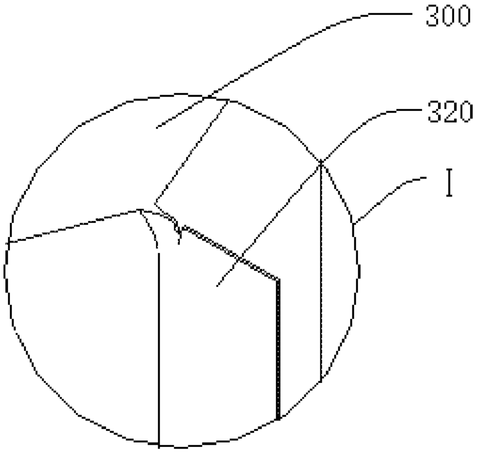
FIG. 4 is an enlarged view showing part of a region I in FIG. 3.

According to an embodiment of the present disclosure, as shown in FIG. 4, the insulating bag 300 is provided with a handle position 320, and by pulling the handle position 320, the position to be torn 310 is torn and fractured. When the user needs to release the insulating bag 300 from the vacuum state, the handle position 320 increases the contact area between the user and the insulating bag 300, and the user can apply a force acting on the insulating bag 300 through the handle position 320 to ensure that the position to be torn 310 can be successfully torn to release the vacuum state of the insulating bag 300. Then, the user continues to apply the acting force to make the position to be torn 310 switch from the state of breakage to the state of fracture to separate the insulating bags 300 located on both sides of the position to be torn 310, and the positive and negative electrodes of the battery module 200 may be exposed on the outside of the insulating bag 300.

According to an embodiment of the present disclosure, as shown in FIG. 4, the handle position 320 is arranged at one end of the insulating bag 300 and extends towards a direction away from the insulating bag 300. Increasing the area of the handle position 320 facilitates that the user contacts the handle position 320 and applies a force through the handle position 320 to break and fracture the position to be torn 310, and the position to be torn 310 can be torn and fractured smoothly.

According to an embodiment of the present disclosure, in combination with what is shown in FIG. 3 and FIG. 4, the position to be torn 310 is arranged at one end of the insulating bag 300 and is close to the handle position 320. By reducing the distance between the position to be torn 310 and the handle position 320, on the one hand, the position to be torn 310 can be smoothly torn and fractured when the user pulls the handle position 320. On the other hand, because after the battery module 200 is inserted into the cavity 110, the handle position 320 is pulled to break the position to be torn 310, when the position to be torn 310 is torn, the battery module 200 abuts against the inner wall of the box 100; then, the battery module 200 drives the insulating bag 300 to abut against the inner wall of the box 100 together, so that the contact area of the insulating bag 300 between the position to be torn 310 and the handle position 320 and the box 100 can be reduced through the described arrangement, which ensures that after the position to be torn 310 is fractured, the insulating bag 300 located between the position to be torn 310 and the handle position 320 can be smoothly removed from the box 100 to expose the positive and negative electrodes of the battery module 200.

Of course, the distance between the position to be torn 310 and the handle position 320 may not be too small. When the distance between the position to be torn 310 and the handle position 320 is too small, it will result in that the positive and negative electrodes of the battery module 200 cannot be exposed after the insulating bag 300 located between the position to be torn 310 and the handle position 320 is removed.

Finally, it is to be noted that: the distance between the position to be torn 310 and the handle position 320 is not specifically limited, as long as it is ensured that when the position to be torn 310 is fractured, the insulating bag 300 located between the position to be torn 310 and the handle position 320 can be smoothly removed from the box 100 and the positive and negative electrodes of the battery module 200 can be exposed on the outside of the insulating bag 300.

According to an embodiment of the present disclosure, during the production of the insulating bag 300, a thickness of the insulating bag 300 located at the position to be torn 310 may be set to be less than a thickness of the other positions of the insulating bag 300 to form the position to be torn 310. It is ensured that the insulating bag 300 may be torn and fractured from the position to be torn 310 when the user pulls the handle position 320.

In some embodiments of the present disclosure, the insulating bag 300 is coated with a fireproof layer. The fireproof layer can effectively block the thermal runaway propagation path, so when thermal runaway occurs in the battery pack 1000, the insulating bag 300 coated with the fireproof layer can effectively prevent the flame and heat from spreading, improving the safety of the battery module 200, and when thermal runaway occurs to the cell 220, the insulating bag 300 can also effectively ensure that the flame and heat cannot be transmitted to the outside of the battery module 200, avoiding endangering the safety of the user.

According to an embodiment of the present disclosure, in the process of production of the battery module 200, the surface of the insulating bag 300 may be sprayed with Teflon or laminated with mica paper to form a high-temperature fireproof layer on the surface of the insulating bag 300. Heat transfer is effectively blocked.

A battery pack 1000 according to the embodiment of the present disclosure is described below with reference to the accompanying drawings.

A battery pack 1000 according to the embodiment of the present disclosure, in combination with what is shown in FIG. 2 and FIG. 3, includes a box 100 and battery modules 200. The box 100 is provided with cavities 110 inside. The battery module 200 is arranged in the cavity 110.

As shown in FIG. 2, the battery module 200 includes foam 210 and multiple cells 220. The foam 210 is arranged between adjacent cells 220.

In combination with what is shown in FIG. 2 and FIG. 3, the outside of the battery module 200 is sleeved with an insulating bag 300, and positive and negative electrodes of the battery module 200 extend out of the insulating bag 300. That is, the positive and negative electrodes of the battery module 200 extend to the outside of the insulating bag 300.

According to the battery pack of an embodiment of the present disclosure, by arranging the battery module in the cavity formed by the box, the box can play a role in protecting the battery module, prolonging the service life of the battery module and improving the safety of the battery module; the foam is arranged between the adjacent cells; the elastic deformation force of the foam can be used for changing the volume of the battery module, which ensures that the box can continuously apply a pre-tightening force to the battery module while the assembly efficiency of the battery pack is improved; and the positive and negative electrodes of the battery module are enabled to extend out of the insulating bag to facilitate connection with other battery modules to form the battery pack. The battery pack of the present disclosure is simple to assemble, small in volume and light in weight.

As can be seen from the described structure, according to the battery pack 1000 according to an embodiment of the present disclosure, by providing the cavity 110 inside the box 100, the cavity 110 provides an avoiding space for arranging the battery module 200 to ensure that the battery module 200 can be assembled inside the box 100. By assembling the battery module 200 inside the cavity 110, on the one hand, the cavity 110 can play a role in protecting the battery module 200. When the battery pack 1000 is impacted, the cavity 110 collapses and absorbs energy, and the box 100 utilizes the strength and stiffness thereof to absorb a part of the impact force, thereby reducing the damage to the battery module 200 caused by the impact force. On the other hand, the cavity 110 provides a mounting space for the battery module 200 and limits the maximum movement position of the battery module 200, preventing the battery module 200 from moving to other positions of the battery pack 1000 in a misaligned manner when the battery pack 1000 is impacted, and improving the positional stability of the battery module 200.

By arranging the foam 210 between adjacent cells 220, in the process of assembling the battery module 200, the foam 210 can play a role of buffer to ensure that no collision occurs between the adjacent cells 220, prolonging the service life of the cell 220, and the foam 210 can be assembled at the initial stage of the multiple cells 220 to provide a fixed pre-tightening force, and can also absorb the expansion force generated by the cell 220 in the later stage of use of the battery module 200.

In the process of assembling the battery module 200 and the box 100, the foam 210 can be used for reducing the volume of the battery module 200, facilitating the insertion of the battery module 200 into the cavity 110 formed by the box 100, improving the assembly efficiency between the battery module 200 and the box 100, and reducing the assembly difficulty. After the battery module 200 and the box 100 are assembled, the foam 210 can also be used for restoring the battery module 200 to the original volume, so that the battery module 200 can abut against the inner wall of the box 100, and sidewalls of the box 100 can give the battery module 200 a good pre-tightening force, so that the battery module 200 is stable in position, and zero-clearance assembly is realized, improving the volume utilization rate of the battery pack 1000.

The outside of the battery module 200 is sleeved with the insulating bag 300, so that when the battery pack 1000 is moved or impacted, avoiding the case that two adjacent battery modules 200 come into contact with each other, causing an internal short circuit, prolonging the service life of the battery module 200 and improving the safety of the battery module 200.

The positive and negative electrodes of the battery module 200 extend to the outside of the insulating bag 300, so that the battery modules 200 in the battery pack 1000 can be connected via the positive and negative electrodes to form the battery pack 1000.

According to an embodiment of the present disclosure, structural adhesive may be used between the cell 220 and the foam 210 for bonding to limit the position between the cell 220 and the foam 210 to improve the structural stability of the battery module 200.

In some embodiments of the present disclosure, as shown in FIG. 3, multiple sequentially arranged cavities 110 are provided in the box 100, and the battery module 200 with the outside sleeved with the insulating bag 300 is arranged in each of the cavities 110. In other words, the multiple battery modules 200 are arranged in the box 100 of the present disclosure, and the multiple cavities 110 separate the multiple battery modules 200, ensuring that during the operation of the battery pack 1000, no contact occurs between the two adjacent battery modules 200, and improving the safety of the battery modules 200. And the outside of the battery module 200 is also sleeved with the insulating bag 300, and the insulating bag 300 further improves the safety of the battery module 200. The present disclosure, by arranging the multiple battery modules 200 within the battery pack 1000, can satisfy the demand of a vehicle for high-capacity and high-voltage batteries, and improve the endurance mileage of the vehicle.

In some embodiments of the present disclosure, the insulating bag 300 is clamped between an inner wall of the cavity 110 and the battery module 200. That is, after the battery module 200 is inserted into the cavity 110, the insulating bag 300 wrapping the outside of the battery module 200 cannot be removed, and on the one hand, the assembly difficulty of the battery pack 1000 is lowered; on the other hand, the insulating bag 300 wrapping the outside of the battery module 200 may also play a role of insulation, improving the safety of the battery module 200.

A vehicle according to an embodiment of the present invention is described below.

A vehicle according to an embodiment of the present disclosure includes a battery pack 1000 described above.

It can be seen from the described structure that according to the vehicle according to an embodiment of the present disclosure, by using the described battery pack 1000, the battery pack 1000 does not occupy too much space at the bottom of the vehicle, and the vehicle can be light in weight, improving the driving experience and the endurance mileage of the vehicle.

The specific structure of the battery pack 1000 in a specific embodiment of present disclosure is described below with reference to the accompanying drawings. The embodiments of the present disclosure may be all embodiments after the foregoing multiple technical solutions are combined, and are not limited to the following specific embodiments, which fall within the scope of the protection of the present disclosure.

Embodiment 1

A battery pack 1000, in combination with what is shown in FIG. 2 and FIG. 3, includes a box 100 and battery modules 200. The box 100 is provided with cavities 110 inside. The battery module 200 is arranged in the cavity 110.

As shown in FIG. 2, the battery module 200 includes foam 210 and multiple cells 220. The foam 210 is arranged between adjacent cells 220.

In combination with what is shown in FIG. 2 and FIG. 3, the outside of the battery module 200 is sleeved with an insulating bag 300. During assembling the battery pack 1000, the battery module 200 is loaded into the insulating bag 300; the insulating bag 300 is vacuumized to compress the foam 210 to reduce the volume of the battery module 200; and after the battery module 200 of the reduced volume is inserted into the cavity 110, a vacuum state is released, and positive and negative electrodes of the battery module 200 extend out of the insulating bag 300.

Embodiment 2

According to a battery pack 1000, on the basis of Embodiment 1, the insulating bag 300 is provided with a handle position 320; the insulating bag 300 is provided with a position to be torn 310, and the position to be torn 310 is formed in the shape of a ring; and by pulling the handle position 320, the position to be torn 310 is torn, and a vacuum state of the insulating bag 300 is released through the breakage.

The position to be torn 310 is fractured to remove a portion of the insulating bag 300 to expose the positive and negative electrodes of the battery module 200.

In the description of the present disclosure, it is to be noted that, unless otherwise explicitly specified or defined, the terms such as "mounting", and "connection" should be understood in a broad sense. For example, the connection may be a fixed connection, a detachable connection, or an integral connection; or the connection may be a mechanical connection or an electrical connection. A person of ordinary skill in the art may understand the specific meanings of the foregoing terms in the present disclosure according to specific situations.

Other configurations of the method for assembling a battery pack 1000, the battery pack 1000, and the vehicle according to the embodiments of the present application, such as the principle for vacuumizing the insulating bag 300, are known to those of ordinary skill in the art, and will not be described in detail here.

In description of this specification, description of reference terms such as "embodiment", or "example", means including specific features, structures, materials, or characteristics described in the embodiment or example in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A method for assembling a battery pack, wherein the battery pack comprises a box and a battery module, the box is provided with cavities inside, the battery module comprises foam and a plurality of cells, the foam is arranged between adjacent cells, the method comprising:

loading the battery module into an insulating bag;

vacuumizing the insulating bag into a vacuum state and the foam is compressed to reduce the volume of the battery module; and after the battery module of the reduced volume is inserted into a cavity of the box, releasing the vacuum state, and exposing positive and negative electrodes of the battery module.

2. The method for assembling a battery pack according to claim 1, wherein the insulating bag is provided with a position to be torn, and the position to be torn can be torn to release the vacuum state.

3. The method for assembling a battery pack according to claim 2, wherein the position to be torn is formed in the shape of a ring, and the position to be torn is fractured to remove a portion of the insulating bag to expose the positive and negative electrodes.

4. The method for assembling a battery pack according to claim 2, wherein the insulating bag is provided with a handle position, and by pulling the handle position, the position to be torn is torn.

5. The method for assembling a battery pack according to claim 1, wherein the insulating bag is coated with a fireproof layer.

6. The method for assembling a battery pack according to claim 2, wherein the insulating bag is coated with a fireproof layer.

7. The method for assembling a battery pack according to claim 3, wherein the insulating bag is coated with a fireproof layer.

8. The method for assembling a battery pack according to claim 4, wherein the insulating bag is coated with a fireproof layer.

9. A battery pack, comprising:

a box, the box being provided with cavities inside; and a battery module, the battery module being arranged in a cavity, the battery module comprising foam and a plurality of cells, the foam being arranged between adjacent cells, the outside of the battery module is sleeved with an insulating bag, and positive and negative electrodes of the battery module extending out of the insulating bag, wherein the battery module is assembled into the battery pack by:

loading the battery module into the insulating bag;

vacuumizing the insulating bag into a vacuum state and the foam is compressed to reduce the volume of the battery module; and after the battery module of the reduced volume is inserted into the cavity, releasing the vacuum state, and exposing the positive and negative electrodes of the battery module.

10. The battery pack according to claim 9, wherein the cavities are sequentially arranged in the box, a plurality of battery modules are provided, and each battery module is sleeved with an insulating bag and is arranged in each of the cavities.

11. The battery pack according to claim 9, wherein the insulating bag is clamped between an inner wall of the cavity and the battery module.

12. A vehicle, comprising: the battery pack according to claim 9.

* * * * *